United States Patent
Muller et al.

(10) Patent No.: US 7,254,413 B2
(45) Date of Patent: Aug. 7, 2007

(54) METHOD AND SYSTEM OF TRANSMISSION POWER CONTROL

(75) Inventors: Walter G. Muller, Upplands Vasby (SE); Petter Blomberg, Sundbyberg (SE); Thomas Lindquist, Möldnal (SE); Justus Petersson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 395 days.

(21) Appl. No.: 10/399,112

(22) PCT Filed: Oct. 17, 2001

(86) PCT No.: PCT/SE01/02269

§ 371 (c)(1),
(2), (4) Date: Aug. 12, 2003

(87) PCT Pub. No.: WO02/33849

PCT Pub. Date: Apr. 25, 2002

(65) Prior Publication Data

US 2004/0038698 A1    Feb. 26, 2004

(30) Foreign Application Priority Data

Oct. 17, 2000    (SE) ................... 0003805
Mar. 30, 2001    (SE) ................... 0101169

(51) Int. Cl.
    *H04B 7/00*    (2006.01)
(52) U.S. Cl. .......................... 455/522; 455/69; 455/70; 370/335

(58) Field of Classification Search ............... 455/522, 455/69, 452, 464, 63.1, 67.13, 710, 115.1; 375/141, 297; 370/238, 335
See application file for complete search history.

(56) References Cited

U.S. PATENT DOCUMENTS

| | | | |
|---|---|---|---|
| 5,982,760 A * | 11/1999 | Chen | 370/335 |
| 6,018,667 A * | 1/2000 | Ghosh et al. | 455/502 |
| 6,747,965 B1* | 6/2004 | Nara et al. | 370/335 |
| 2002/0126739 A1* | 9/2002 | Tiedemann et al. | 375/141 |
| 2002/0151310 A1* | 10/2002 | Chung et al. | 455/452 |
| 2002/0172217 A1* | 11/2002 | Kadaba et al. | 370/443 |
| 2006/0098759 A1* | 5/2006 | Tiedemann et al. | 375/297 |

FOREIGN PATENT DOCUMENTS

| | | |
|---|---|---|
| EP | 0680160 A2 | 11/1995 |
| EP | 0896442 A1 | 2/1999 |
| EP | 1032237 A1 | 8/2000 |
| WO | 00/62441 A1 | 10/2000 |

* cited by examiner

*Primary Examiner*—Matthew Anderson
*Assistant Examiner*—Tan Trinh
(74) *Attorney, Agent, or Firm*—Nixon & Vanderhye P.C.

(57) ABSTRACT

The present invention relates to cellular mobile radio systems, and more especially it relates to Code Division Multiple Access, CDMA, cellular mobile radio systems, particularly to transmission power control in such systems. A method and apparatus transmitting TPC bits with inherent out-of-sync information and transmission power differential determined on the basis of soft handover status information and out-of-sync status information is disclosed. An associated method and apparatus receiving the TPC bits and controlling transmission power accordingly is presented.

30 Claims, 12 Drawing Sheets

METHOD AND SYSTEM OF TRANSMISSION POWER CONTROL

This application is the US national phase of international application PCT/SE01/02269 filed 17 Oct. 2001, which designated the US.

1. Technical Field of the Invention

The present invention relates to cellular mobile radio systems, and more especially it relates to Code Division Multiple Access, CDMA, cellular mobile radio systems, particularly to transmission power control in such systems.

2. Background and Description of Related Art

Transmission power control, TPC, transmitting single or multiple TPC bits from a radio base station, RBS, to a mobile station, MS, informing the receiving party to increase or decrease, optionally by a specified amount, the transmission power level is previously known. It is also known to combine TPC bits from two different RBSes during handover from one RBS to another.

Transmission power control compensates for signal fading and interference dynamics at a receiver. Closed loop power control according to prior art is described in relation to FIG. 1. In closed loop power control received pilot channel signal to interference ratio, SIR, is measured at the receiving end (RBS for uplink). The level of the SIR equals the SIR or a quantized value thereof. The level of the SIR is compared with a target level. Information on the outcome of the comparison is fed back in the reverse direction in the form of TPC bits. Within this patent application, this is referred to as a regular transmission power control. Radio wave propagation and power control processing introduces a delay in the feedback loop. The transmitting end adjusts transmission power in response to received TPC bits. The receiving end receives, at a propagation delayed time, a pilot signal transmitted at the adjusted level, closing the power control loop. If the level of the measured SIR is larger than the target level the receiving end transmits a command towards the transmitting end (MS for uplink) to decrease the power at the transmitting end. If the level of the measured SIR is smaller than the target level the transmitting end is correspondingly instructed to increase the transmission power. Finally, if the level of the measured SIR is equal to the target level the receiving end receives no command, a command of no change of transmission power or interchanging commands of transmission power increase and decrease to keep the transmission power close to constant. The command to increase or decrease transmission power is sent by means of one or more TPC bits.

During poor channel quality conditions the received signal level at the receiving end is low and transmission errors are frequent. If the received signal quality is worse than a predefined threshold during a predefined time, the link is said to be out of sync. According to prior art the receiving end instructs the transmitting end to increase transmission power, generally as fast as possible. In FIG. 1, an optional, dependent on slot format and link direction, TFCI field represents a Transport Format Combination Indicator for use e.g. when several simultaneous services are included. In FIG. 2, a mobile station, MS, communicates with two or more RBSes, RBS 1 and RBS 2, during soft handover according to prior art. Strictly speaking, soft handover is a category of handover procedures where the radio links are added and abandoned in such manner that the MS always keeps at least one radio link to the terrestrial radio access network. Loosely speaking, soft handover consequently involves two or more radio links. During soft handover the transmitting end (MS for uplink) receives TPC bits from the RBSes. According to prior art the MS is instructed to transmit at the lowest power level out of those indicated by the TPC bits from the RBSes respectively. Generally the MS has information that it is involved in a soft handover, but the RBSes have not.

$3^{rd}$ Generation Partnership Project (3GPP): *Technical Specification Group Radio Access Network, Physical Layer Procedures, 3G TS* 25.214 v3.3.0, France, June 2000, specifies in section 4.3 uplink synchronization primitives, radio link set states and radio link monitoring. Synchronization status is checked for all radio link sets. There are three radio link set states defined: initial state, out-of-sync state and in-sync state. One synchronization status indication is given per radio link set. Poor quality link sets are indicated to be out of sync. Criteria for indicating out-of-sync could be based on control channel quality or cyclic redundancy checking. The technical specification also specifies two algorithms (Algorithm 1 and Algorithm 2) for combining of TPC commands, including combining of TPC commands during soft handover. Basically, a TPC command comprises one bit, indicating a power increase or decrease. During soft handover there is one such basic TPC bit for each of the links involved, to be combined into a TPC command. The technical specification also describes processing of multi-slot TPC commands in relation to Algorithm 2. A rapid power increase is achieved by transmitting a series of TPC bits indicating power increase. Correspondingly, a rapid power decrease is achieved by transmitting a series of TPC bits indicating a power decrease. A slow or moderate speed power increase/decrease is achieved by transmitting TPC bits in an alternating series of increases and decreases. A net increase is achieved if the number of TPC bits indicating a power increase exceeds the number of TPC bits indicating a power decrease. Correspondingly, a net decrease is achieved if the number of TPC bits indicating a power decrease exceeds the number of TPC bits indicating a power increase. The larger the relative number of TPC bits indicating increases or decreases the faster the power increase and decrease respectively.

European Patent Application EP0975185 discloses a method, and base and mobile stations for transmitting, receiving and detecting TPC bits from a plurality of base stations during soft handover. The patent application combines received and detected TPC bits to be used for transmission power control of the mobile station.

European Patent Application EP0680160 also discloses a method of power control during soft handover. The mobile station uses the lowest transmission power level out of those indicated by two RBSes to keep transmission power at a low level.

International Patent Application WO9952310 relates to a method and apparatus for closed loop transmission power control in a mobile telecommunication system. Transmission power is compared to a target level. The difference is subdivided into power correction steps. The power correction steps are adjusted according to the closed loop power control.

International Patent Application WO9953630 reveals a method of power offset adjustment of transmission power control commands in relation to downlink information.

German Patent Application DE19850849 uses different step sizes when increasing and decreasing transmission power respectively.

None of the cited documents above discloses a closed loop transmission power control where measures are undertaken either at the transmitter end or at the receiver end to achieve an accurate transmission power level in a situation where an uplink from an MS to an RBS transmitting TPC bits is out-of-sync and the MS receives TPC bits from this RBS and at least one more RBS

SUMMARY OF THE INVENTION

Poor quality link sets are indicated to be out of sync. Increasing transmission power may restore a radio link set being out of sync. However, in order to minimize interference and power consumption, transmission power should be kept at a minimum. There are at least two problems inherent in prior art solutions relating to transmission power control and uplinks out-of-sync.

If an RBS commands the MS to increase transmission power rapidly, the transmission power can increase more than necessary due to time lag, leading to an increased interference level.

If the RBS commands the MS to increase transmission power slowly, an MS with no information on the uplink being out-of-sync will, inappropriately, frequently disregard TPC bits from another RBS that is not out-of-sync in order to minimize transmission power during soft handover.

It is consequently an object of the present invention to increase transmission power at a balanced speed and interference level without risking to disregard TPC bits concerning an uplink that is not out-of-sync, particularly during soft handover.

It is also an object to communicate the uplink out-of-sync status to the mobile station.

Another object is to communicate out-of-sync status information between one or more RBS and at least one RNC involved in a connection between an MS and an RNC.

A further object is to communicate soft handover status to an RBS.

An object is also to utilize out-of-sync status information and soft handover status information in closed loop transmission power control.

Finally, it is an object to realize an efficient method and apparatus for communication of out-of-sync and soft handover status information.

These objects are met by a method and apparatus transmitting TPC bits with inherent out-of-sync information and transmission power differential determined on the basis of soft handover status information and out-of-sync status information, and by a method and apparatus receiving the TPC bits and associated control bits and controlling transmission power accordingly.

According to the invention, a command of transmission power increase at high speed is transmitted from at least one RBS to an MS if the uplink from the MS to the at least one RBS is out of sync, but not all uplinks, associated with a connection involving the MS and the at least one RBS, are out of sync and the MS and the at least one RBS are involved in soft handover. The MS increases transmission power at moderate speed if all uplinks, associated with the connection, are out of sync.

According to a first additional embodiment of the invention, a command of transmission power increase at high speed is transmitted from an RBS to an MS if the uplink, associated with the RBS and the MS, is out of sync and the MS and the RBS are involved in soft handover.

According to a second additional embodiment, a predefined power control bit pattern is transmitted from the RBS to the MS if the uplink, associated with the RBS and the MS, is out of sync. The MS disregards this power control command associated with the power control bit pattern if it is involved in soft handover and at least one of the uplinks from the MS is not out of sync.

In a third additional embodiment, the RBS transmits an additional control bit to indicate that the uplink is out of sync. The MS then disregards the TPC bits concerning this link if it is involved in a soft handover and at least one of the uplinks from the MS is not out of sync.

In the three additional embodiments, the MS increases transmission power at a moderate speed, preferably selected in relation to the system time lag, if the uplink is out of sync and the MS is not involved in a soft handover.

Preferred embodiments of the invention, by way of examples, are described with reference to the accompanying drawings below.

DESCRIPTION OF PREFERRED EMBODIMENTS

In particularly a CDMA system it is important to control the uplink (and downlink) transmission power to a level not larger than necessary in order to keep the interference level and power consumption of the system at a minimum.

As previously mentioned, if the received signal quality is worse than a predefined threshold during a predefined time, the link is said to be out of sync. As an alternative to the received signal level, SIR, for determining whether the link is out of sync, bit error rate, BER, the relative number of transmissions in error, or other measures indicating channel quality can be used. An out-of-sync indicator is set to indicate whether the link is out of sync.

Figure 3:
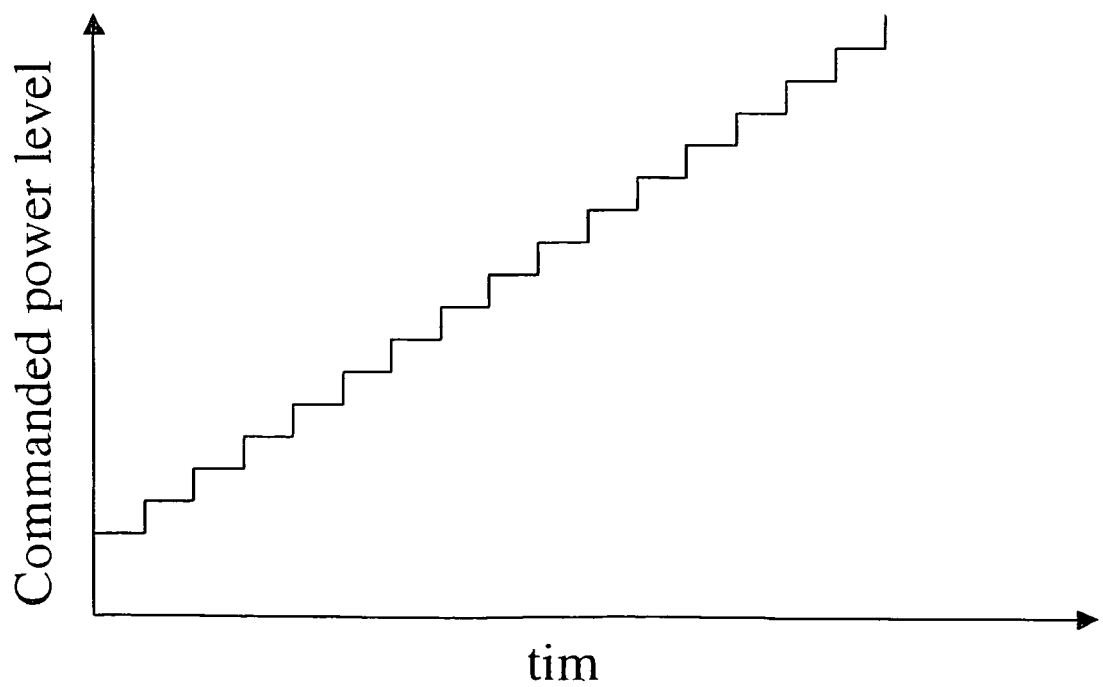
FIG. 3 illustrates an incrementally commanded power level versus time, in the case of a maximally fast power increase, according to the invention.
Figure 4:
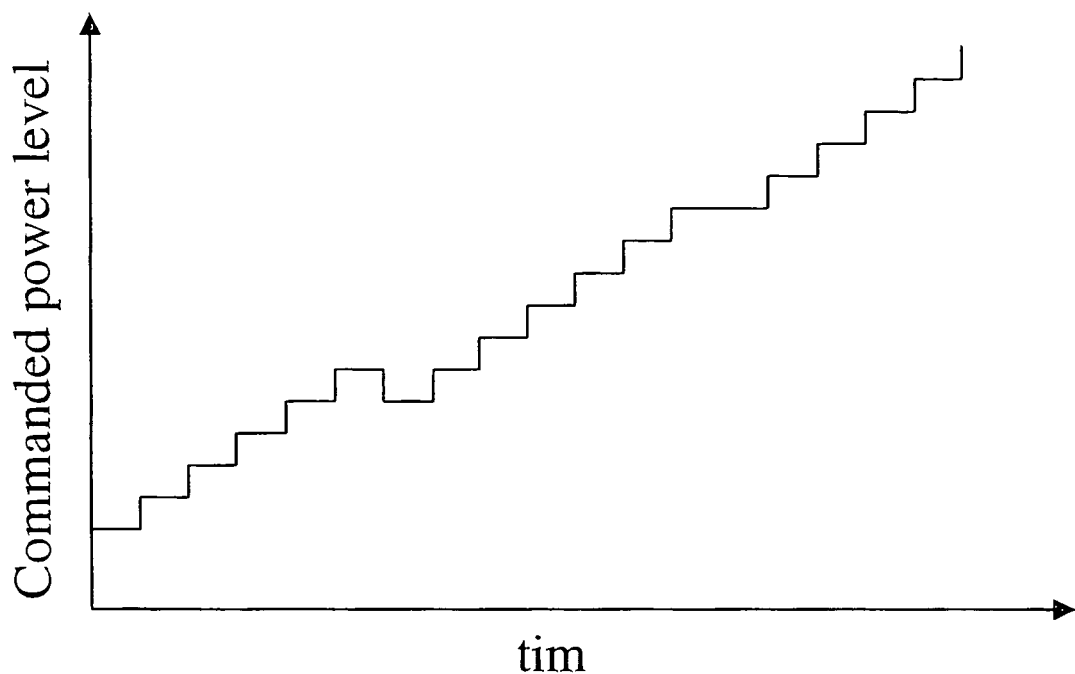
FIG. 4 illustrates an incrementally commanded power level versus time, with an almost maximally fast power increase, according to the invention.
Figure 5:
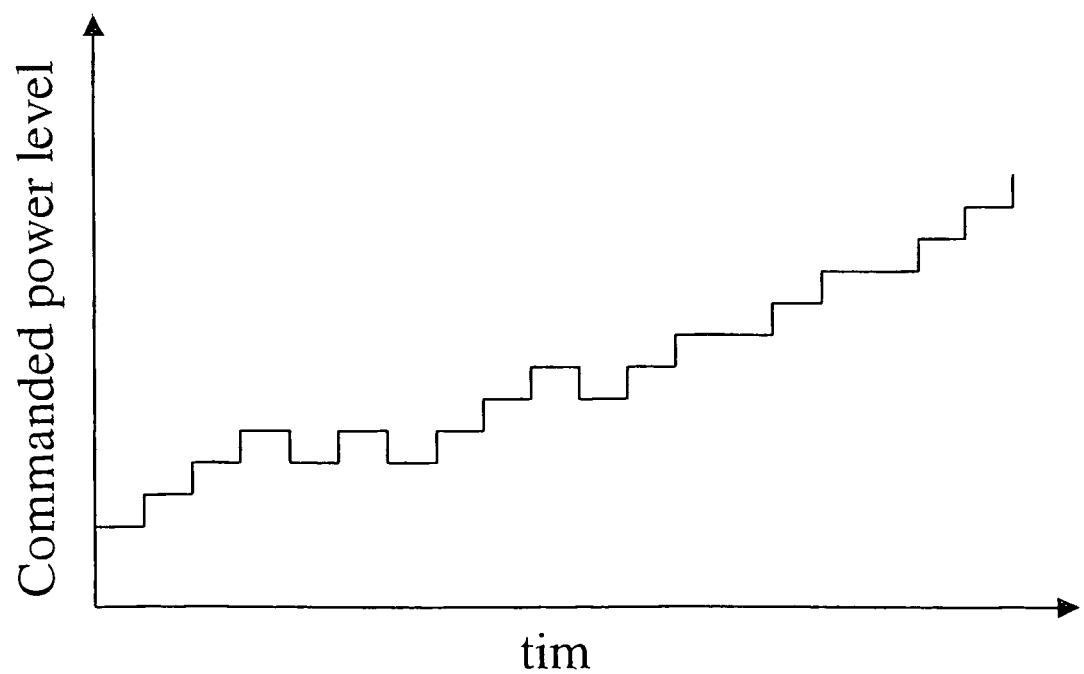
FIG. 5 illustrates an incrementally commanded power level versus time, in the case of a moderately fast power increase, according to the invention.

FIG. 3 illustrates an incrementally commanded maximally fast power increase, i.e. given a fixed step size and fixed time instances for power adjustments the slope of the commanded power level versus time is maximized. FIG. 4, using the same step size and time scale as in FIG. 3, illustrates a commanded power increase almost as fast as the power increase depicted in FIG. 3. Both FIGS. 3 and 4 are examples of power increases at high speed within the meaning of this patent application. Using the same step size and time scale as in FIGS. 3 and 4, FIG. 5 illustrates a power increase at a notably lower rate than the power increases of FIGS. 3 and 4. A power increase at a notably lower rate than the high-speed power increase is called a power increase at moderate speed within this patent application. The preferred ratio between the two rates is dependent upon the particular implementation. As a rule of thumb and with no restriction of the scope of this patent application, the slope difference between the power increases at high speed and moderate speed respectively may be in the order of 10% or more. Preferably and with no restriction of the scope of this patent application, sequences of lengths in the range of 3–20 bits form a bases for determination of slope ratio and for TPC bit selection regarding power increases at moderate speed.

FIG. 4 illustrates that a power increase at high speed can be achieved irrespective of whether the power differentials are only allowed to be strictly positive or negative or if also power control commands indicating no change are allowed. Correspondingly a power increase at moderate speed can be obtained by using power control commands including only strictly positive or negative power differentials or by also using power control commands indicating no change.

Figure 6:
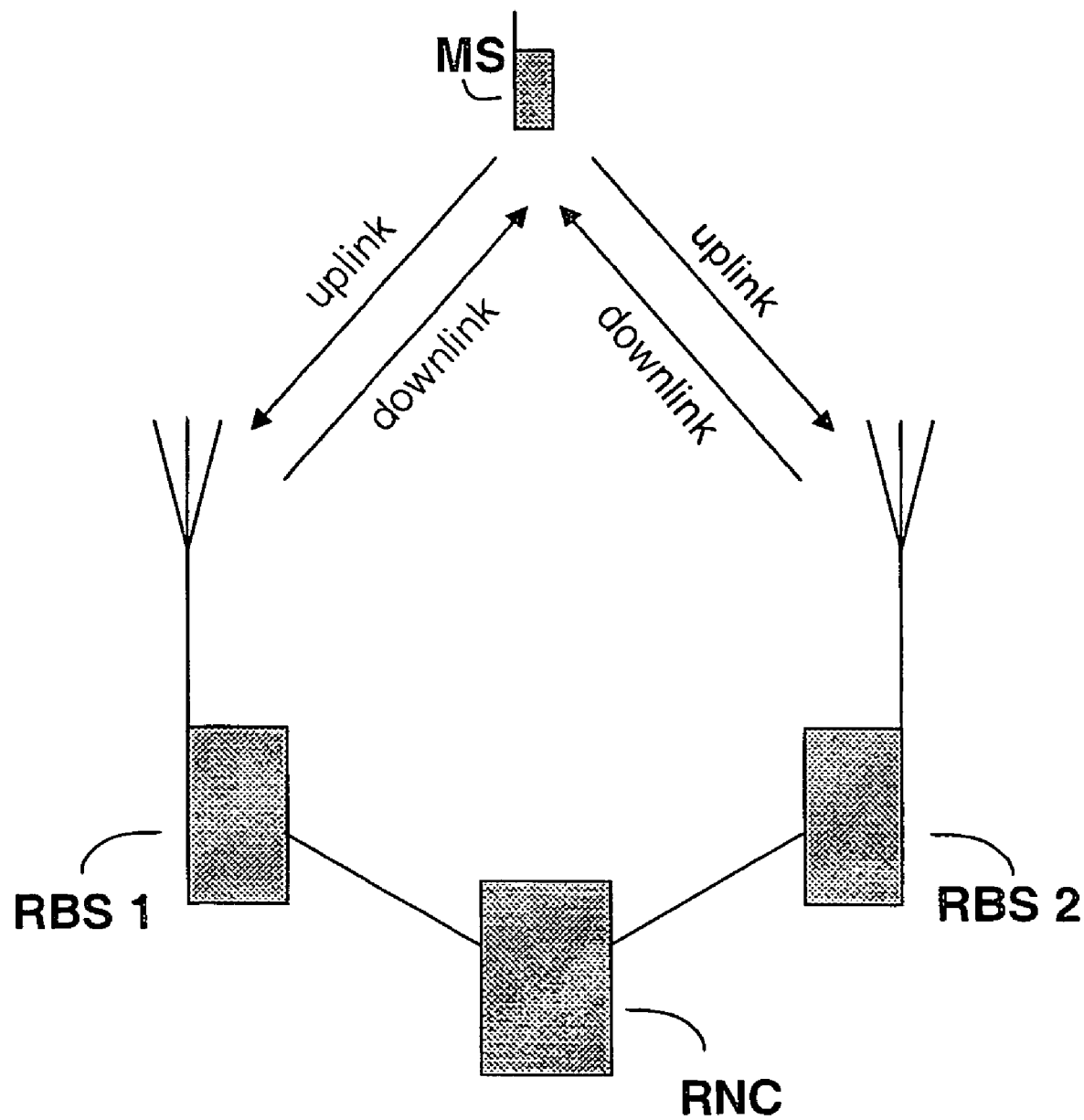
FIG. 6 shows a network controller, RNC, and two RBSes involved in a connection between the RNC and an MS, according to the invention.

With reference to FIG. 6, an RBS to which the uplink is out of sync acquires soft handover status information and/or out-of-sync status information from a radio network controller, RNC, to which the MS is connected. Alternatively, the RNC automatically transmits soft handover information and/or out-of-sync status information to the RBS. Within this patent application, an RNC is understood as a network element including a radio resource controller. According to a first primary embodiment of the invention, assuming that the uplink to a first RBS, RBS 1, is out-of-sync, this RBS inquires the RNC if it is involved in a soft handover or, alternatively, is informed by the RNC whenever the RBS is involved in a soft handover. If involved in a soft handover, it also inquires the RNC for out-of-sync status information or, alternatively, is informed by the RNC whenever all RBSes involved in a connection are out of sync. According to a second primary embodiment of the invention, again assuming that the uplink to the first RBS, RBS 1, is out of sync, this RBS inquires the RNC for a connection out-of-sync status information, revealing if all uplinks of a connection between an MS and an RNC are out of sync. With two RBSes involved in the connection, as displayed in FIG. 6, this is the case if the uplinks to RBS 1 and RBS 2 are both out of sync. For both primary embodiments, RBS 1 selects and transmits TPC commands according to the soft handover and/or out-of-sync status information received.

Figure 7:
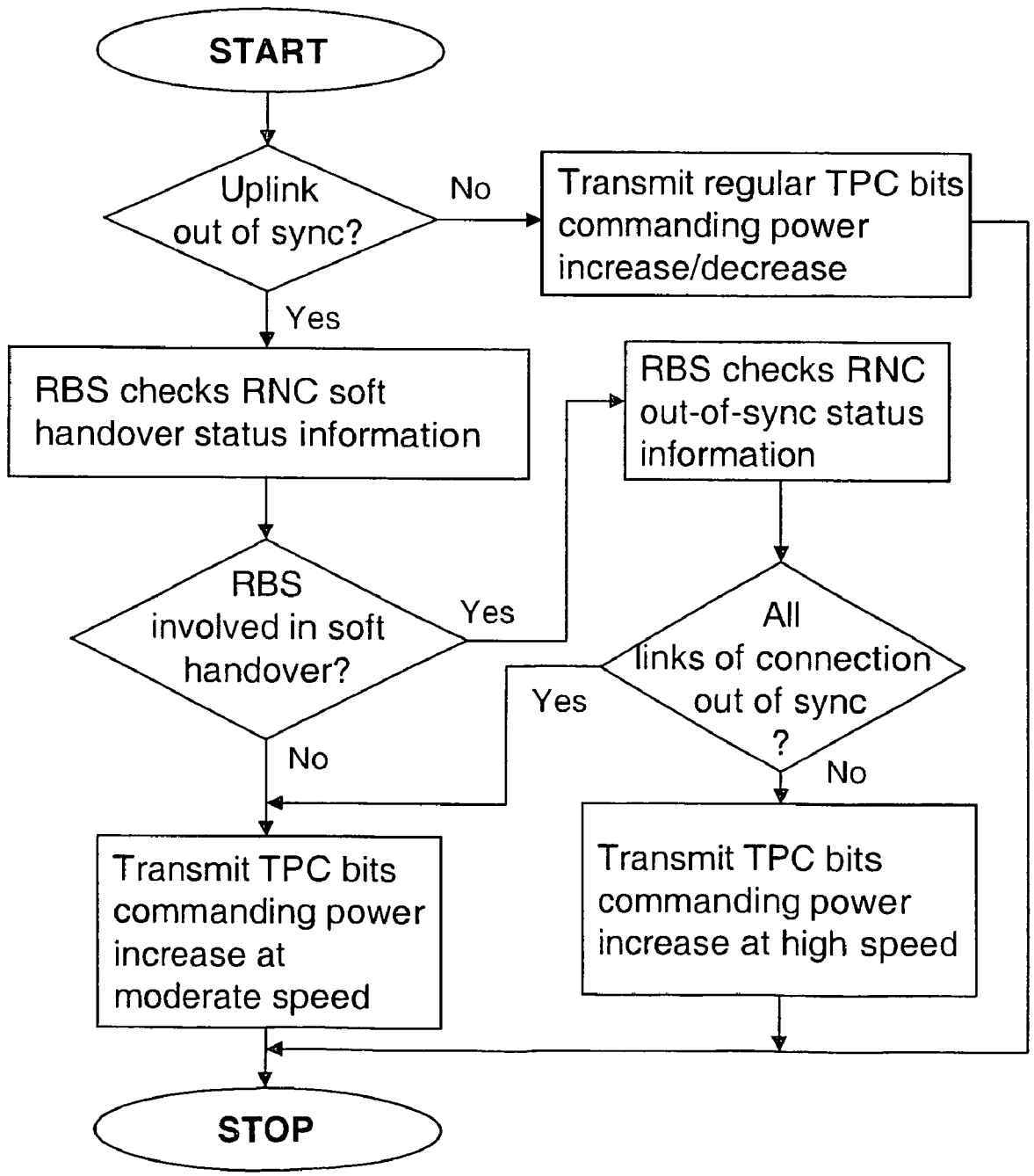
FIG. 7 is a flow chart describing the communication, according to the invention, between one RBS to which the uplink is out of sync and the RNC to which the MS is connected.

According to additional embodiments, assuming that the uplink to a first RBS, RBS 1, is out-of-sync, this RBS inquires the RNC if it is involved in a soft handover or, alternatively, is informed by the RNC whenever the RBS is involved in a soft handover. RBS 1 selects and transmits TPC commands according to the soft handover status information A flow chart describing how power control commands are influenced, according to the first primary embodiment, is shown in FIG. 7. The MS and RNC of a connection have information on soft handover status. An RBS decides if a link is out-of-sync by checking an out-of-sync indicator, the indicator determined as set forth above. RBSes provide the RNC with information on their out-of-sync status, at least when uplink is out of sync. With reference to FIG. 7, an RBS to which the uplink is out of sync checks the soft handover status information. Either the RBS acquires this information as need be or the information is transmitted to the RBS whenever the RBS is involved in a soft handover. Next, if the RBS is out of sync and involved in soft handover it investigates RNC out-of-sync status information regarding other links of the MS-RNC connection. If the RBS to which the uplink is out of sync and the MS to which it is connected are involved in a soft handover but not all of the links associated with the soft handover of the MS being out-of-sync, the RBS transmits TPC bits corresponding to a command of power increase at high speed to the MS. Preferably, this speed should correspond to the highest power increase speed used within the system. If not involved in soft handover or, if involved in a soft handover and all links associated with the soft handover of the MS are out of sync, the RBS transmits TPC bits corresponding to a command of transmission power increase at moderate speed. When the uplink is not out of sync, it transmits TPC bits corresponding to a regular transmission power increase/decrease.

Figure 8:
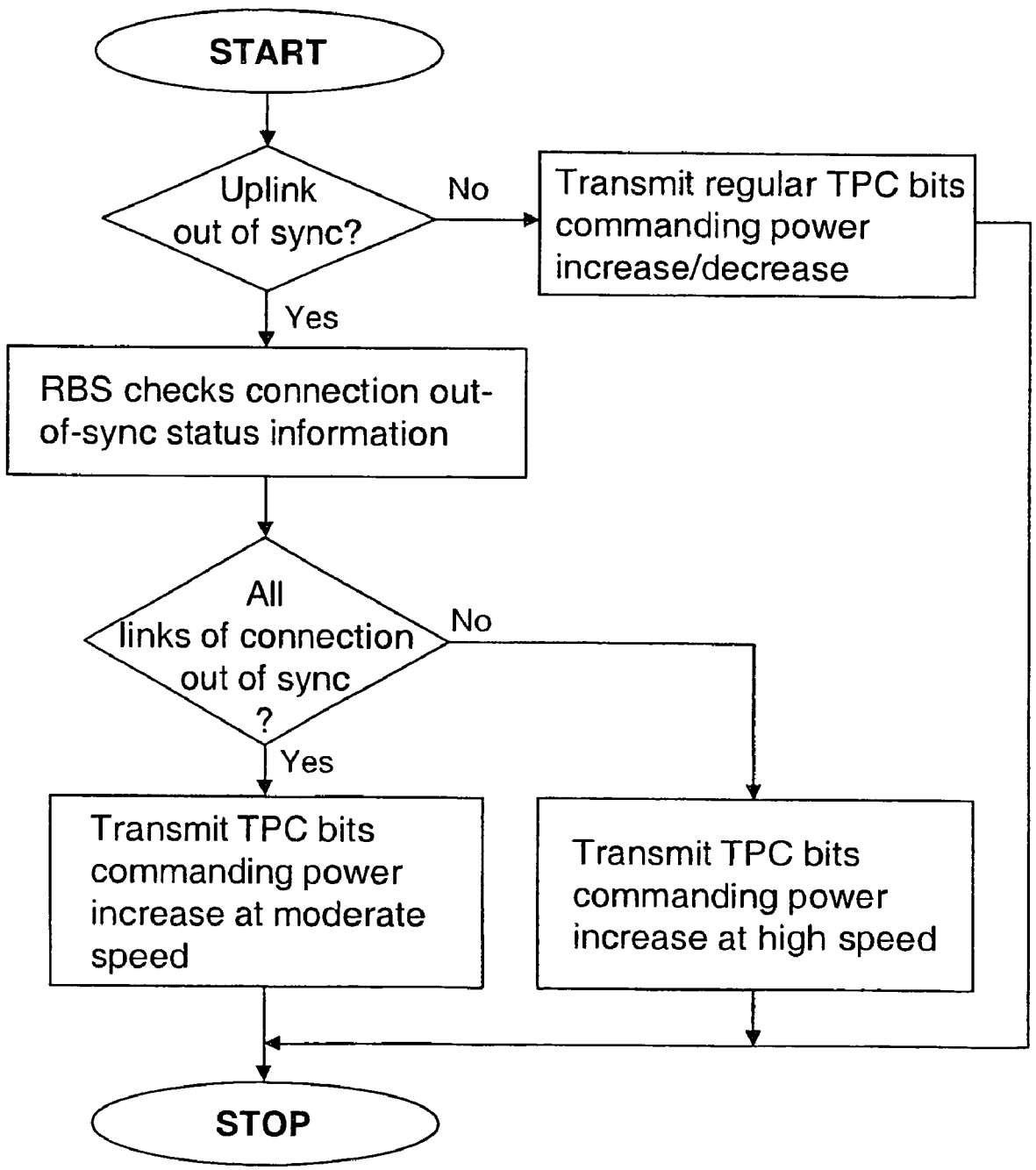
FIG. 8 is a flow chart describing the communication, according to a preferred embodiment of the invention, between one RBS to which the uplink is out of sync and the RNC to which the MS is connected.

A flow chart describing how power control commands are influenced in a preferred embodiment of the invention is depicted in FIG. 8. The MS and RNC of a connection have information on soft handover status. An RBS decides if a link is out-of-sync by checking a link out-of-sync indicator, the indicator determined as set forth above. Each RBS involved in a connection between an MS and an RNC communicates its link out-of-sync status to a network element, preferably the RNC, at least when the uplink to the RBS is out-of-sync. As the RNC has information on both soft handover over status and link out-of-sync status of all RBSes involved in a connection between the RNC and the MS, only one status information needs to be communicated to the RBS. In FIG. 8 this status information is referred to as connection out-of-sync status information. If all RBSes associated with a connection involving the MS and the RBS are out of sync, connection out-of-sync status is set. Otherwise, it is not. If the RBS to which the uplink is out of sync and the MS to which it is connected are involved in a soft handover but not all of the links associated with the soft handover of the MS are out-of sync, i.e. connection out-of-sync status is not set, the RBS transmits TPC bits corresponding to a command of power increase at high speed to the MS. Preferably, this speed should correspond to the highest power increase speed used within the system. If not involved in soft handover or, if involved in a soft handover and all links associated with the soft handover of the MS are out of sync, i.e. connection out-of-sync status is set, the RBS transmits TPC bits corresponding to a command of transmission power increase at moderate speed. When the uplink is not out of sync, the RBS transmits TPC bits corresponding to a regular transmission power increase/decrease.

Of course, if one or more RBSes of a connection does not comprise means for communicating its out-of-sync status to the RNC, the RNC can use a default value for this RBS out-of-sync status when determining the connection out-of-sync status.

Figure 9:
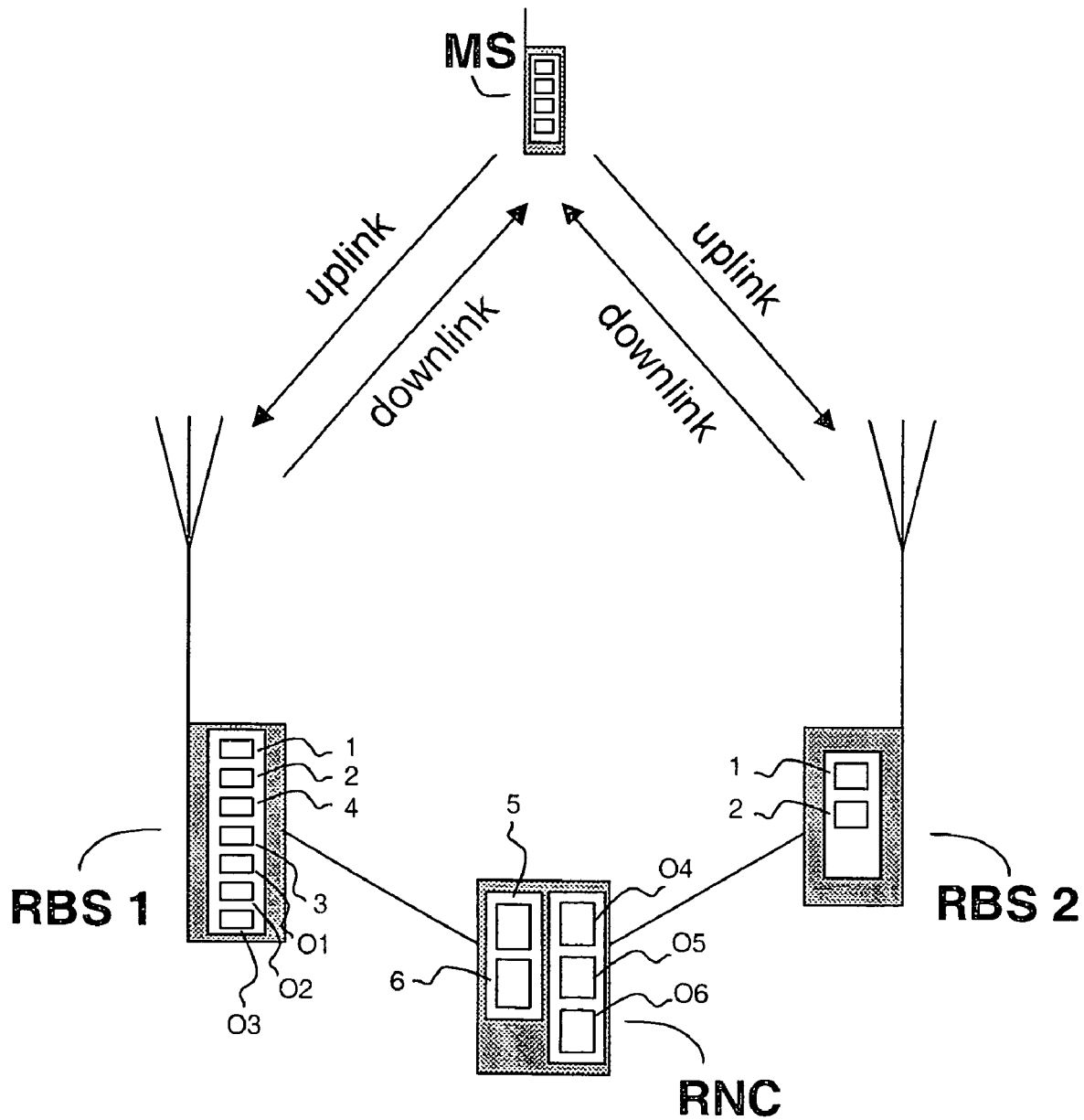
FIG. 9 schematically illustrates a mobile station, MS, two radio base stations, RBS 1 and RBS 2, and a radio network controller, RNC, according to the invention.

FIG. 9 schematically illustrates a system including an MS, two RBSes and an RNC according to the invention. The system instruments the method described above. With no loss of generality, a soft handover involving two RBSes and one RNC is illustrated but may readily be extended to involve more than two RBSes and more than one RNC. The invention is not limited to omnidirectional radio base stations. It can readily be used irrespective of whether the radio base stations use directional or omnidirectional antenna radiation patterns. A first RBS, RBS 1, is provided, according to the invention, with means 1 for detection of link quality, means 2 for transmission of a first second or third power control command, means 3 for reception of soft handover status from a radio network element RNC, and optionally means 4 for inquiring an RNC for soft handover status. It also comprises means O1 delivering out-of-sync status information to a radio network controller, means O2 for receiving out-of-sync status information from a radio network controller, and optionally means O3 for inquiring an RNC for out-of-sync status information. Means 1–4 and O1–O3 can be included in the RBS or connected as one or more separate devices. For the preferred embodiment, described in detail in relation to FIG. 8, means 3, 4 and O3 are only optional.

An RNC is provided with means 5 for receiving an inquiry for soft handover status information from RBS 1 and means 6 for transmission of soft handover status to RBS 1 and other base stations operating accordingly. Soft handover status information may be transmitted automatically or only as inquired. In the former case means 5 for receiving an inquiry for soft handover status information from the RBS can be omitted if all connected base stations operate accordingly. The RNC is also provided with means O4 for reception of out-of-sync status information from connected radio base stations RBS 1 and RBS 2, means O5 for transmission of out-of-sync status information to RBS 1 or other base stations operating accordingly, and optionally means O6 for receiving an inquiry from RBS 1, or other base station operating accordingly, for out-of-sync status information. Out-of-sync status information may be transmitted automatically or only as inquired. For the preferred embodiment, described in detail in relation to FIG. 8, means 5 and 6 are only optional.

RBS 1 and RBS 2 are equipped with logic as needed to decide on which power control command to transmit. According to the invention, the RNC is equipped with logic to decide if the conditions to transmit soft handover status are being met or not. The MS includes logic to decide if conditions to disregard TPC bits are met or not.

Figure 10:
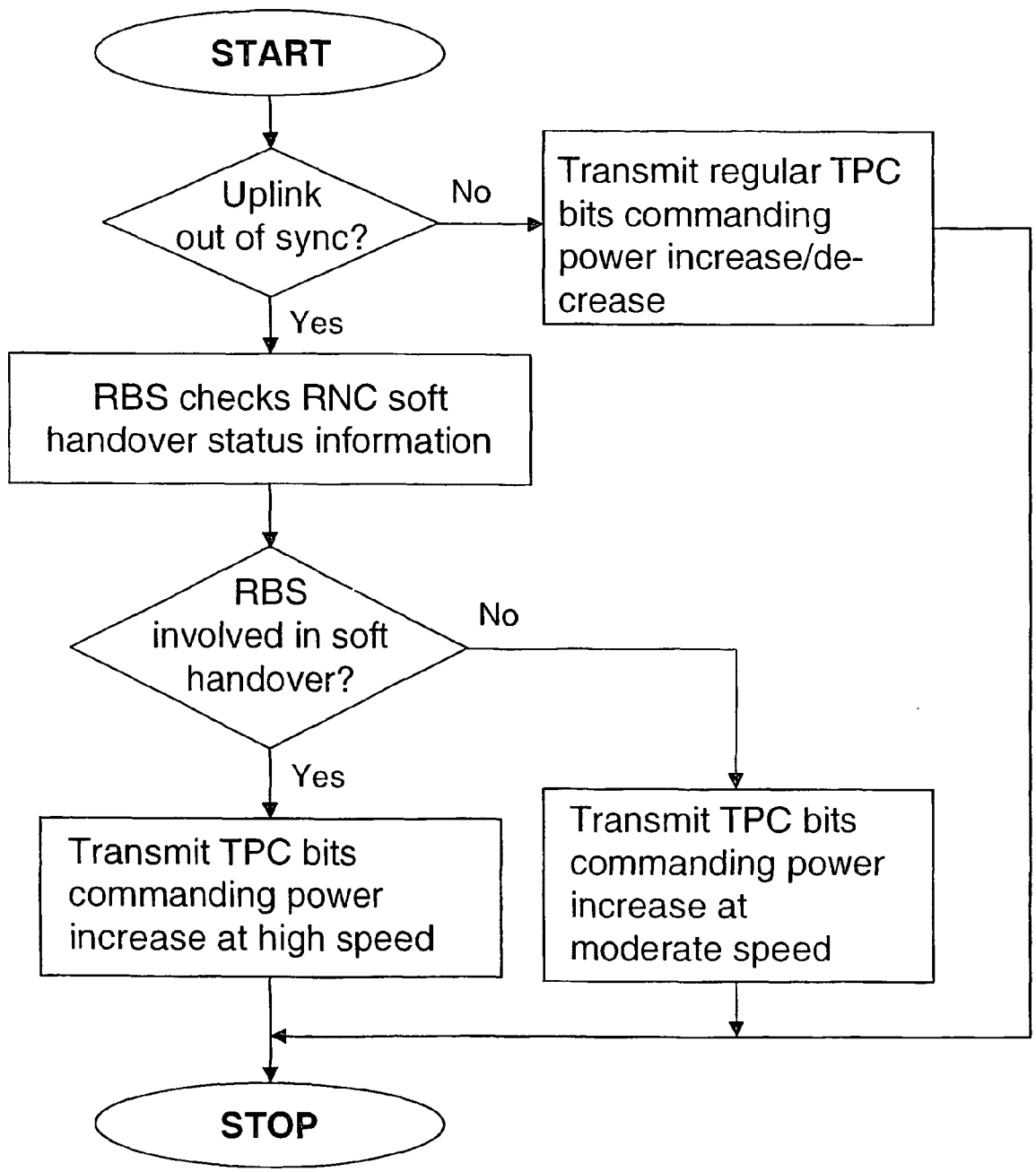
FIG. 10 is a flow chart describing the communication, according to the invention, between one RBS to which the uplink is out of sync and the RNC to which the MS is connected.

A flow chart describing how power control commands are influenced according to a first additional embodiment is disclosed in FIG. 10. The MS and RNC of a connection have information on soft handover status. An RBS decides if the link is out-of-sync by checking an out-of-sync indicator, the indicator determined as set forth above. An RBS to which the uplink is out of sync first checks the soft handover status information. Either the RBS acquires this information as need be or the information is transmitted to the RBS whenever the RBS is involved in a soft handover. Next, if the RBS is out of sync and involved in soft handover, it transmits TPC bits corresponding to a command of power increase at high speed to the MS. Preferably, this speed should correspond to the highest power increase speed used within the system. If not involved in soft handover, the RBS transmits TPC bits corresponding to a command of transmission power increase at moderate speed. When the uplink is not out of sync, it transmits TPC bits corresponding to a regular transmission power increase/decrease.

Figure 11:
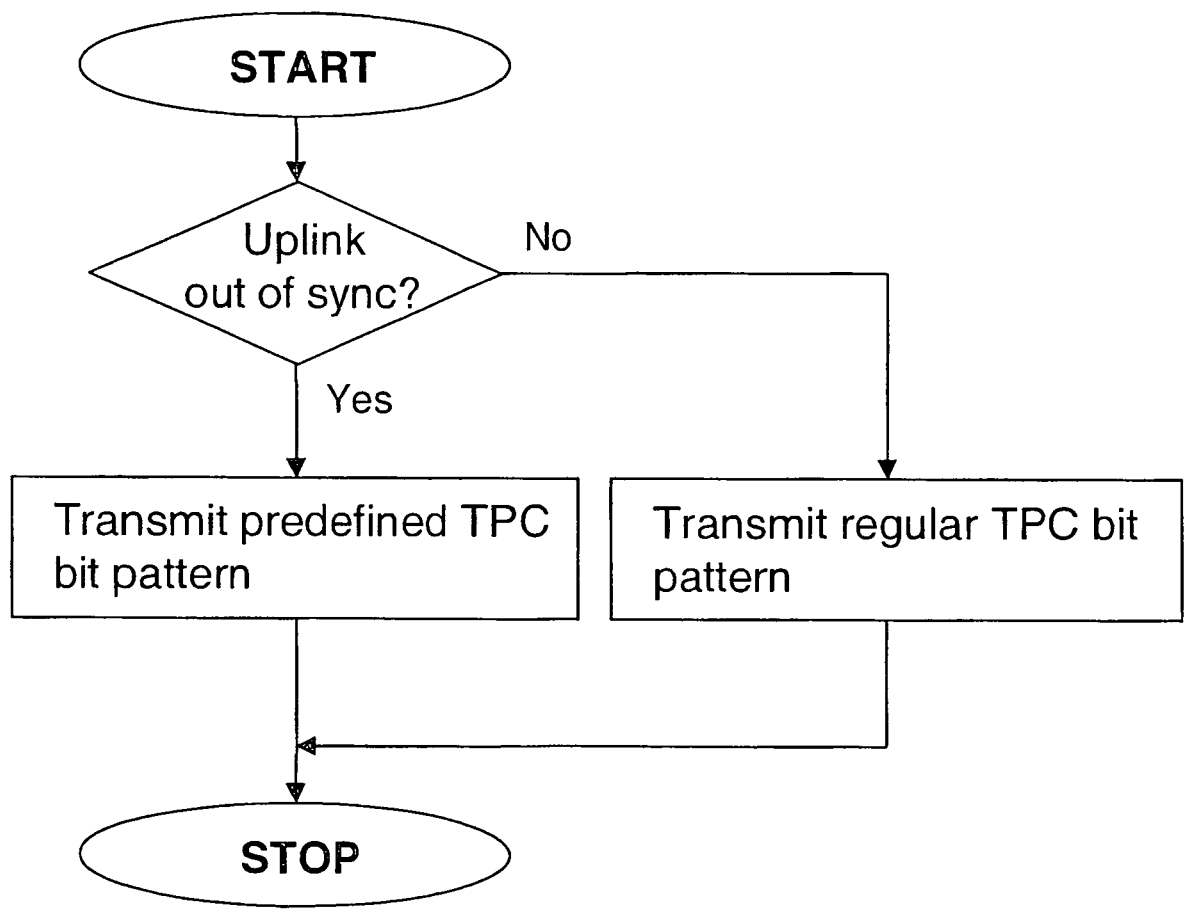
FIG. 11 shows a flowchart explaining communication, according to the invention, of out-of-sync status information.

With reference to FIG. 11, according to a second additional embodiment an RBS decides if the link is out of sync by checking an out-of-sync indicator, the indicator determined as set forth above. Then, the RBS transmits a predefined TPC bit pattern according to the second additional embodiment of the invention if the uplink from the transmitter to the receiver is out of sync; otherwise a TPC bit pattern corresponding to a regular transmission power increase/decrease command is transmitted. Preferably the predefined bit pattern corresponds to a power increase at moderate speed. The TPC bit pattern is transmitted irrespective of soft handover status. Consequently, for this purpose soft handover status information is not required at the RBS. An MS involved in a soft handover holds status information on this and includes it in the process of making a decision on the basis of the received bit pattern, see FIG. 13. If the MS is involved in a soft handover and at least one link is not out of sync it disregards the received predefined bit pattern indicating an uplink out of sync, otherwise its transmission power is increased at moderate speed as explained below.

Figure 1:
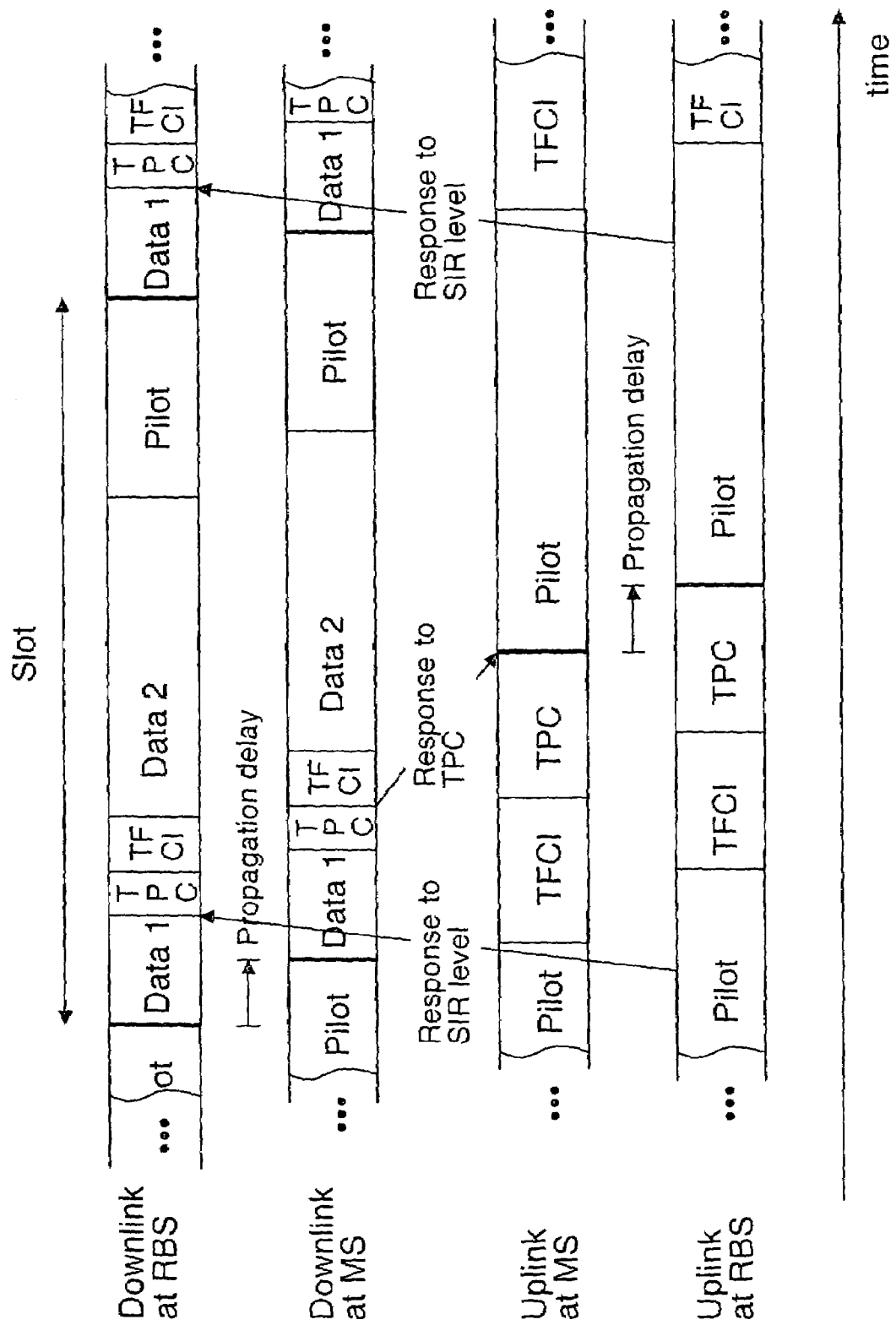
FIG. 1 displays timing, according to prior art, of transmission of TPC bits and subsequent response to TPC.
Figure 2:
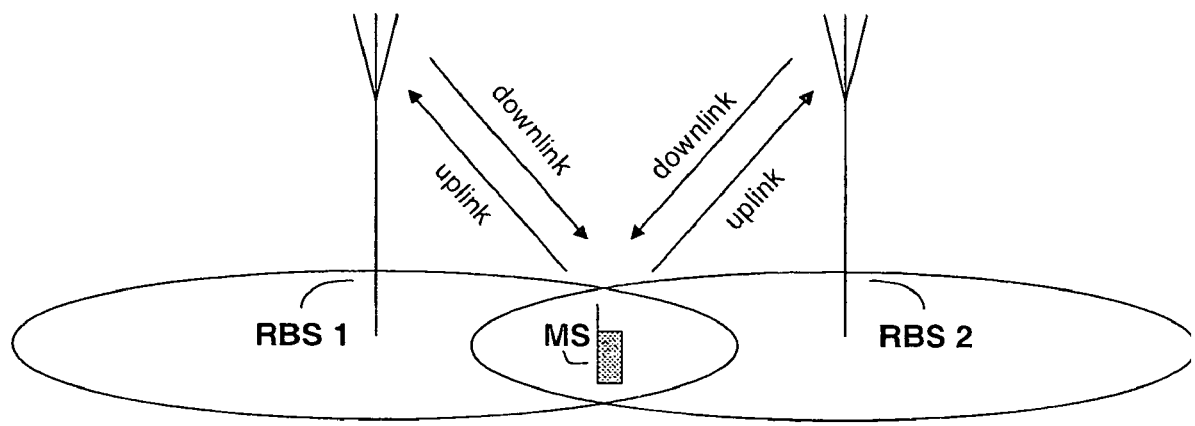
FIG. 2 schematically illustrates a mobile station, MS, communicating, according to prior art, with two radio base stations, RBS 1 and RBS 2, during soft handover.
Figure 12:
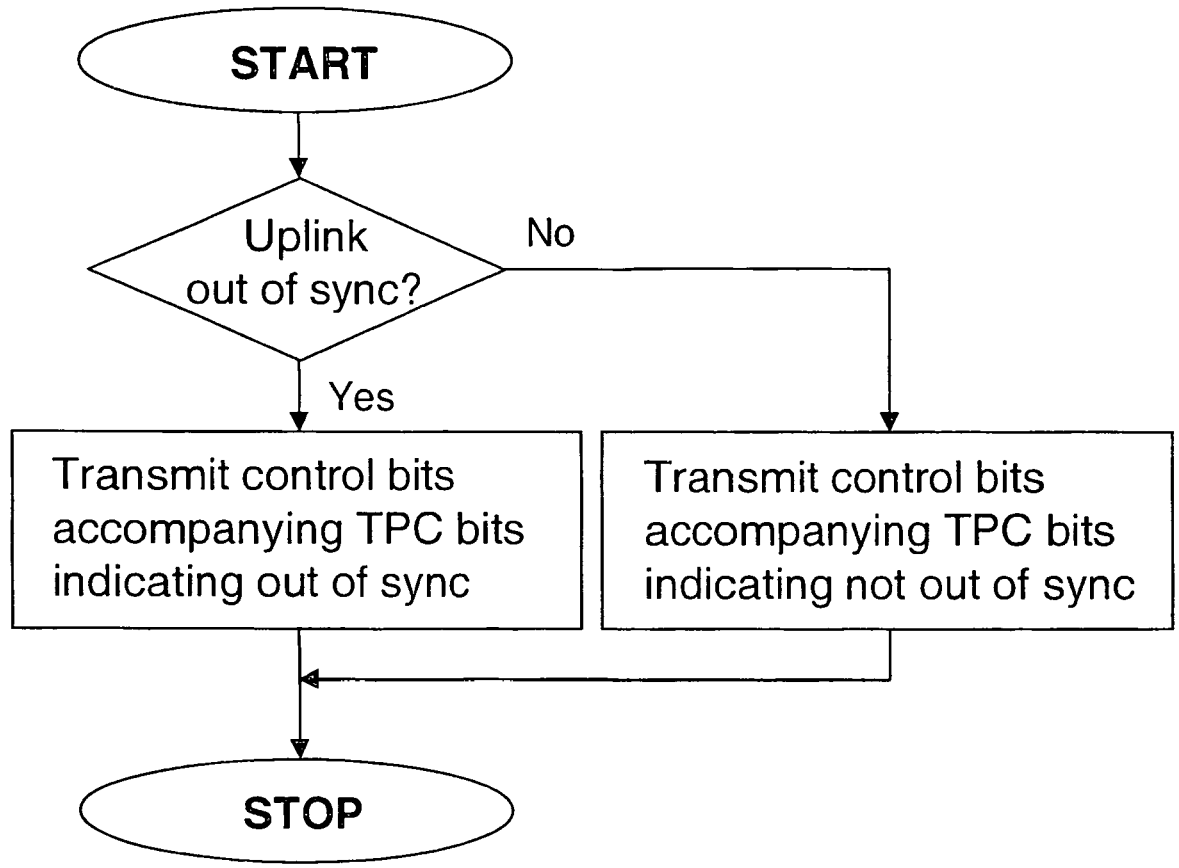
FIG. 12 shows another flowchart describing communication, according to the invention, of out-of-sync status information.

With reference to FIG. 12, according to a third additional embodiment of the invention an RBS transmits one or more additional control bits with the TPC bits. The RBS decides if the link is out-of-sync by checking an out-of-sync indicator, the indicator determined as set forth above. Depending on this decision, it transmits control bits indicating whether the uplink is out of sync or not. When the uplink is not out of sync TPC bits corresponding to a regular transmission power increase/decrease are transmitted. When the uplink is out of sync the RBS preferably transmits TPC bits corresponding to a transmission power increase at moderate speed. TPC bits and associated control bits are transmitted irrespective of soft handover status. Consequently, for this purpose soft handover status information is not required at the RBS. An MS involved in soft handover holds status information on this and includes it in the process of making a decision on the basis of the received TPC bits, as explained in connection to FIG. 10 below. Transmission bit positions in an existing slot structure as e.g. displayed in FIG. 1 of associated control bits can be achieved by reassigning reserved bit positions, such as bit positions reserved for TPC bits or pilot symbols. When not bound to an existing slot structure dedicated bit positions for the purpose of such control bits can be introduced.

Figure 13:
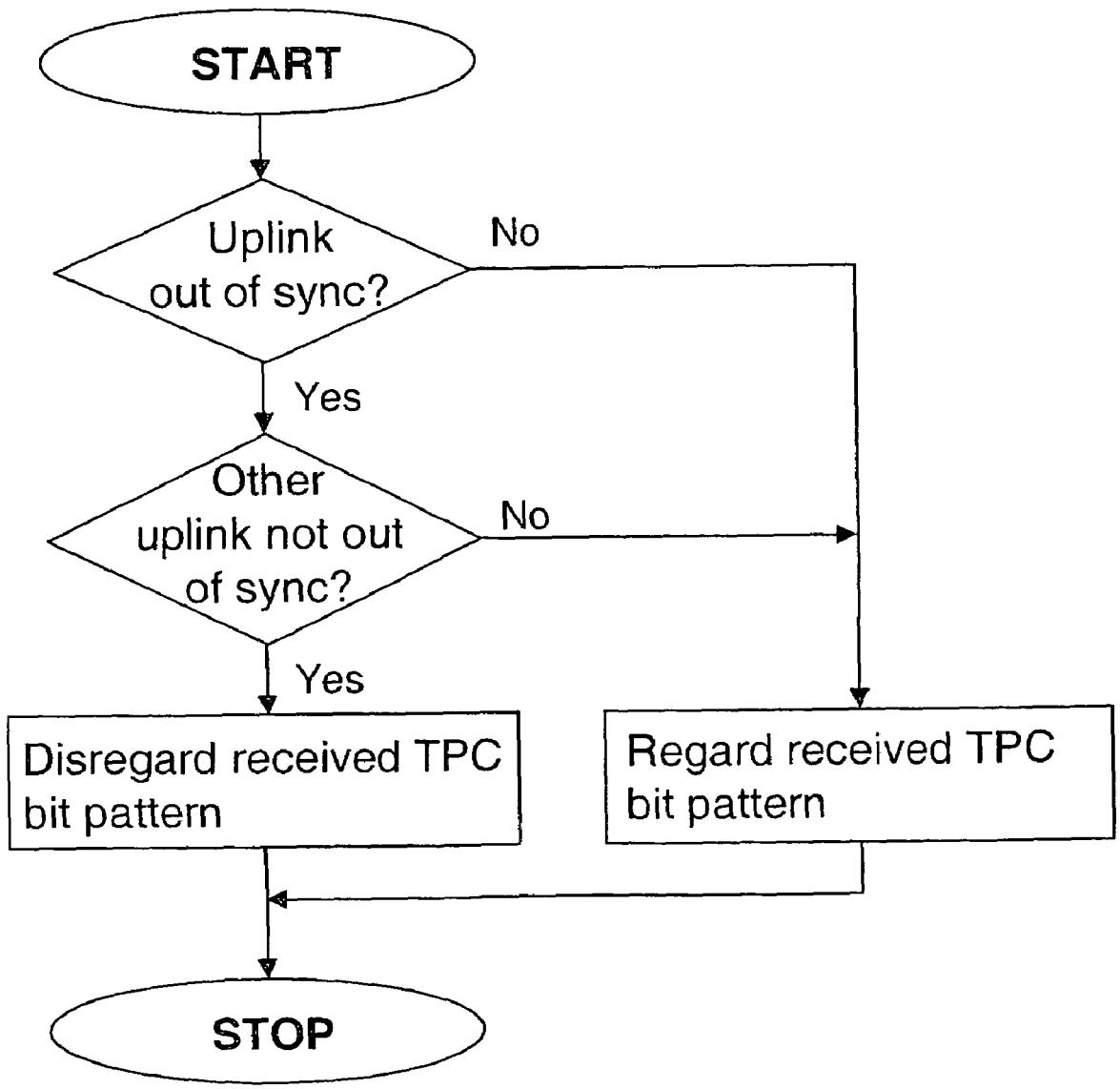
FIG. 13 is a flow chart explaining transmission power control with out-of-sync status information and soft handover status information.

According to FIG. 13 an MS according to the second and third embodiments receives a power control command relating to an uplink. If this is a power control command indicating uplink out of sync the MS investigates whether it is involved in a soft handover or not. In the former case it disregards the TPC bit pattern as far as transmission power is concerned if at least one uplink is not out-of-sync and increases transmission power at moderate speed according to a predefined bit pattern if all uplinks are out-of-sync. It also increases transmission power at a moderate speed if the MS is not involved in a soft handover. Preferably the transmitted predefined TPC bit pattern corresponds to a transmission power control command at moderate speed, when the uplink is out-of-sync. If this is not the case the MS interprets the received TPC command to be a power control command at moderate speed. If the uplink is not out of sync, transmission power is adjusted in accordance with regular transmission power control.

Figure 14:
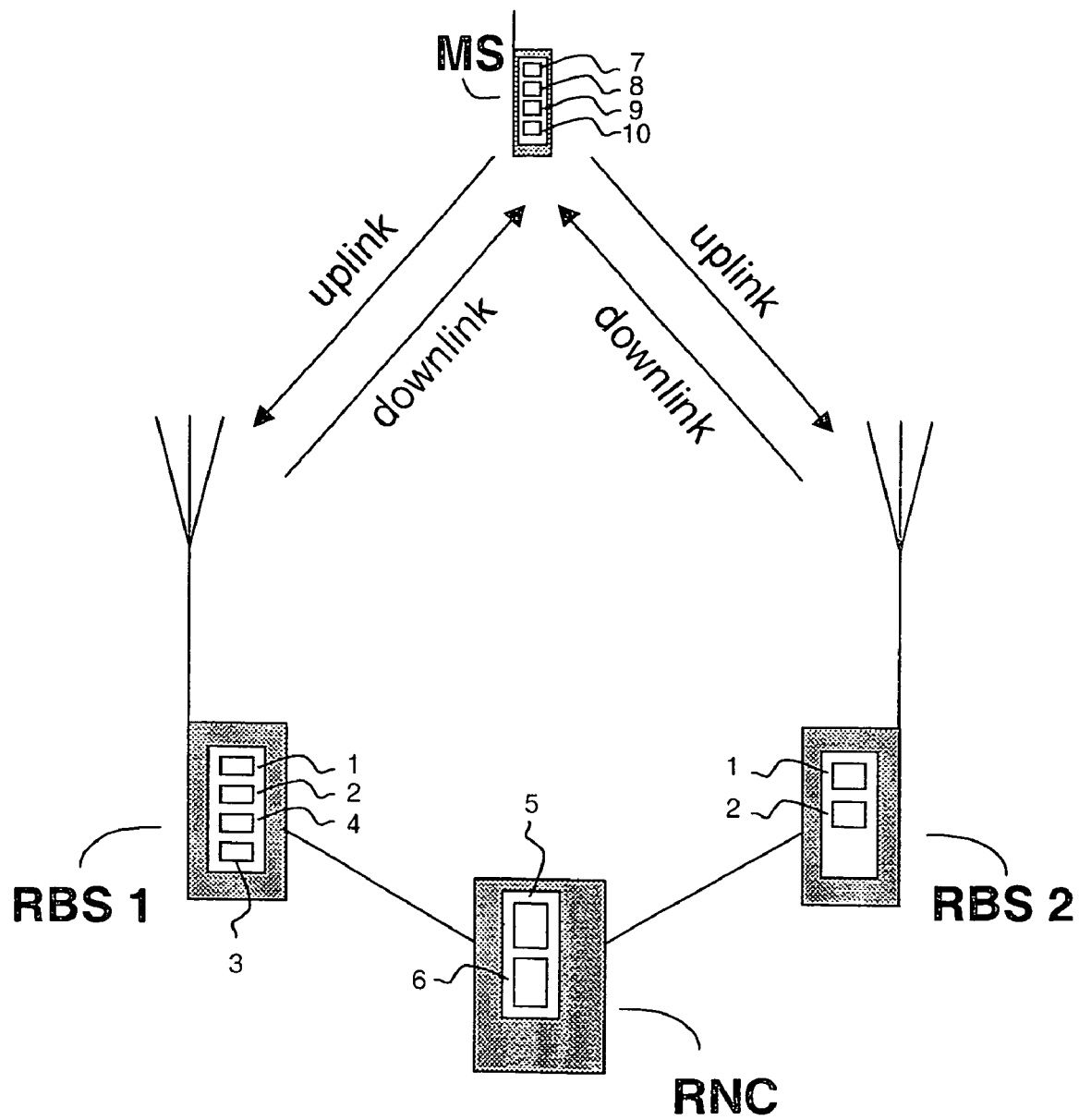
FIG. 14 schematically illustrates a mobile station, MS, two radio base stations, RBS 1 and RBS 2, and a radio network controller, RNC, according to the invention.

FIG. 14 schematically illustrates a system including an MS, two RBSes and an RNC. The system instruments the additional embodiments of the invention described above. With no loss of generality, a soft handover involving two RBSes and one RNC is illustrated but may readily be extended to involve more than two RBSes and more than one RNC. In this figure the RBSes are indicated to operate omnidirectionally. However, the invention is not limited to omnidirectional radio base stations. It can readily be used irrespective of whether the radio base stations use directional or omnidirectional antenna radiation patterns. A first RBS, RBS 1, is provided, according to the first additional embodiment of the invention, with means 1 for detection of link quality, means 2 for transmission of a first, second or third power control command, means 3 for reception of soft handover status from a radio network element RNC, and optionally means 4 for inquiring an RNC for soft handover status. A second RBS, RBS 2, according to the second or third additional embodiment is equipped with means 1 for detection of link quality and means 2 for transmission of a first or second power control command with associated out-of-sync status or power control commands arranged in bit patterns. Means 1–4 can be included in the RBS or connected as one or more separate devices.

An RNC is provided with means 5 for receiving an inquiry for soft handover status information from RBS 1 and means 6 for transmission of soft handover status to RBS 1 and other base stations operating according to the first embodiment. Soft handover status information may be transmitted automatically or only as inquired. In the former case means 5 for receiving an inquiry for soft handover status information from the RBS can be omitted if all connected base stations operate accordingly.

An MS is furnished with means 7 for receiving information on out-of-sync status from RBSes to which it has established links and means 8 for identifying and disregarding or interpreting predefined associated power control commands. In additional embodiments two and three the MS makes use of soft handover and uplink out-of-sync status information stored in memory means 9. In the second additional embodiment and optionally in the third additional embodiment, a predefined TPC bit pattern or command sequence is stored in storage means 10. Means 7–10 can be included in the MS or connected as one or more separate devices.

RBS 1 and RBS 2 are equipped with logic as needed to decide on which power control command, in additional embodiment three inclusive of control bit, or bit pattern to transmit. According to the first additional embodiment, the RNC is equipped with logic to decide if the conditions to transmit soft handover status are being met or not. The MS includes logic to decide if the conditions to disregard TPC bits are met or not. Preferably, a predefined bit pattern is identified by comparing the received bit patterns with a stored version of the predefined bit pattern in the mobile station.

A person skilled in the art readily understands that the receiver and transmitter properties of an RBS or an MS are general in nature. The use of concepts such as RBS, MS or RNC within this patent application is not intended to limit the invention only to devices associated with these acronyms. It concerns all devices operating correspondingly, or being obvious to adapt thereto by a person skilled in the art, in relation to the invention. As an explicit non-exclusive example the invention relates to mobile stations without a subscriber identity module, SIM, as well as user equipments including one or more SIMs.

The invention is not intended to be limited only to the embodiments described in detail above. Changes and modifications may be made without departing from the invention. It covers all modifications within the scope of the following claims.

The invention claimed is:

1. A method of communicating power control commands from a receiver to a transmitter over a feedback link based on a signal quality associated with a communications link from the transmitter to the receiver, the power control commands instructing the transmitter to modify a power level at which the transmitter transmits over the communications link, wherein the receiver has a predefined out-of-sync threshold and the communications link to the receiver is out-of-sync if a detected signal quality associated with the communications link is lower than the predefined out-of-sync threshold during a predefined time, the method comprising:

detecting that the communications link is out-of-sync and involved in soft handover before a first power control command is communicated over the feedback link, wherein the first power control command instructs the transmitter to increase the power level that the transmitter transmits over the communications link at a first power increase rate;

if the communications link is out-of-sync and if the transmitter is not involved in a soft handover, communicating over the feedback link a second power control command instructing the transmitter to increase the power level that the transmitter transmits over the communications link at a second power increase rate lower than the first power increase rate; and if the communications link is not out-of-sync, communicating over the feedback link a third power control command instructing the transmitter to increase the power level that the transmitter transmits over the communications link at a third power increase rate lower than the first and the second power increase rates.

2. The method according to claim 1, wherein the second power control command is communicated over the feedback link if the transmitter is involved in a soft handover and all communication links involved in a connection with the transmitter are indicated to be out-of-sync, and wherein the first power control command is communicated over the feedback link if the transmitter is involved in a soft handover and not all communication links involved in a connection with the transmitter are indicated to be out-of-sync.

3. The method according to claim 1, wherein if multiple receivers are involved in a soft handover connection with the transmitter, the method further comprises:

each of the receivers sending synchronization status information associated with the respective communication link between the transmitter and the receiver to a radio network element.

4. The method according to claim 3, further comprising: determining from the radio network element an out-of-sync status of one or more links involved in the soft handover connection.

5. The method according to claim 3, further comprising: the radio network element sending an indicator to each of the multiple receivers indicating whether the communication links involved in the connection are all out-of-sync.

6. The method according to claim 1, wherein the first power control command is communicated if the transmitter and receiver are involved in a soft handover and the second power control command is communicated if transmitter and receiver are not involved in a soft handover.

7. The method according to claim 1, wherein the first power increase rate differs from the second power increase rate by 10% or more.

8. The method according to claim 1, wherein each of the first, second, and third power control commands is a bit sequence including 3–20 bits.

9. The method according to claim 1, wherein the transmitter is associated with a user equipment or a mobile station and the receiver is associated with a radio base station.

10. The method according to claim 1, wherein the first power control command commands a rapid power increase rate, the second power control command commands a moderate power increase rate, and the third power control command commands a normal power increase rate.

11. A method for use in a transmitter, comprising:

transmitting a signal to a receiver over a communications link;

receiving power control commands from a receiver over a feedback link based on a signal quality associated with a communications link, the power control commands instructing the transmitter to modify a power level at which the transmitter transmits over the communications link, where the receiver has a predefined out-of-sync threshold, and where the first communications link to the receiver is out-of-sync if a detected signal quality associated with the communications link is worse than the predefined out-of-sync threshold during a predefined time;

receiving over the feedback link a first power control command if the communications link is out-of-sync, the first power control command includes a first predefined transmit power control bit pattern that instructs the transmitter to increase the power level that the transmitter transmits over the communications link at a first power increase rate;

receiving over the feedback link a second power control command if the communications link is not out-of-sync, wherein the second power control command includes a second predefined transmit power control bit pattern that instructs the transmitter to increase the power level that the transmitter transmits over the communications link at a second power increase rate slower than the first power increase rate; and disregarding the first power control command if the transmitter is involved in a soft handover and at least one soft handover communications link from the transmitter is not out-of-sync.

12. The method according to claim 11, wherein the first power control command includes one or more control bits indicating the communications link is out-of-sync.

13. The method according to claim 11, wherein the first power increase rate is a moderate increase rate and the second power increase rate is a regular rate normally used to increase the transmitter's power level for transmitting over the first communications link.

14. The method according to claim 11, wherein the transmitter is associated with a user equipment or a mobile station.

15. The method according to claim 11, wherein the receiver is associated with a radio base station.

16. Receiver apparatus for use in processing a signal transmitted by a transmitter over a communications link to the receiver, comprising:

a signal quality detector for detecting a signal quality associated with the communications link and for detecting that the communications link is out-of-sync if the detected signal quality associated with the communications link is worse than a predefined out-of-sync threshold during a predefined time;

transmitting circuitry for sending power control commands to the transmitter over a feedback link based on the detected signal quality, the power control commands instructing the transmitter to modify a power level at which the transmitter transmits over the first communications link;

logic circuitry arranged to provide power control commands to the transmitting circuitry to generate:

a first power control command that the communications link is out-of-sync an involved in soft handover before a first power control command is communicated over the feedback link, wherein the first power control command instructs the transmitter to increase the power level that the transmitter transmits over the communications link at a first power increase rate;

a second power control command if the communications link is out-of-sync and if the transmitter is not involved in a soft handover, wherein the second power control command instructs the transmitter to increase the power level that the transmitter transmits over the communications link at a second power increase rate lower than the first power increase rate; and a third power control command if the communications link is not out-of-sync, wherein the third power control command instructs the transmitter to increase the power level that the transmitter transmits over the communications link at a third power increase rate lower than the first and the second power increase rates.

17. The receiver apparatus according to claim 16, wherein the second power control command is communicated over the feedback link if the transmitter is involved in a soft handover and all communication links involved in a connection with the transmitter are indicated to be out-of-sync, and wherein the first power control command is communicated over the feedback link if the transmitter is involved in a soft handover and not all communication links involved in a connection with the transmitter are indicated to be out-of-sync.

18. The receiver apparatus according to claim 16 implemented in each of where multiple receivers involved in a soft handover connection with the transmitter, each receiver apparatus being configured to send synchronization status information associated with the respective communication link between the transmitter and its corresponding receiver to a radio network element.

19. The receiver apparatus according to claim 18, wherein the logic circuitry is configured to determine from the radio network element an out-of-sync status of one or more links involved in the soft handover connection.

20. The receiver apparatus according to claim 18, wherein the logic circuitry is configured to receive from the radio network element an indicator indicating whether the communication links involved in the connection are all out-of-sync.

21. The receiver apparatus according to claim 16, wherein the first power control command is communicated if the transmitter and receiver are involved in a soft handover and the second power control command is communicated if transmitter and receiver are not involved in a soft handover.

22. The receiver apparatus according to claim 16, wherein the first power increase rate differs from the second power increase rate by 10% or more.

23. The receiver apparatus according to claim 16, wherein each of the first, second, and third power control commands is a bit sequence including 3–20 bits.

24. The receiver apparatus according to claim 16, wherein the transmitter is associated with a user equipment or a mobile station and wherein the receiver is associated with a radio base station.

25. The receiver apparatus according to claim 16, wherein the first power control command commands a rapid power increase rate, the second power control command commands a moderate power increase rate, and the third power control command commands a normal power increase rate.

26. Apparatus for use in a transmitter, comprising:
  a transmitter for transmitting a signal to a receiver over a communications link;
  a receiver for receiving power control commands from a receiver over a feedback link based on a signal quality associated with a communications link, the power control commands instructing the transmitter to modify a power level at which the transmitter transmits over the communications link, where the receiver has a predefined out-of-sync threshold, and where the first communications link to the receiver is out-of-sync if a detected signal quality associated with the communications link is worse than the predefined out-of-sync threshold during a predefined time;
  receiving over the feedback link a first power control command if the communications link is out-of-sync, the first power control command includes a first predefined transmit power control bit pattern that instructs the transmitter to increase the power level that the transmitter transmits over the communications link at a first power increase rate;
  receiving over the feedback link a second power control command if the communications link is not out-of-sync, wherein the second power control command includes a second predefined transmit power control bit pattern that instructs the transmitter to increase the power level that the transmitter transmits over the communications link at a second power increase rate slower than the first power increase rate; and
  logic circuitry configured to disregard the first power control command if the transmitter is involved in a soft handover and at least one soft handover communications link from the transmitter is not out-of-sync.

27. The transmitter apparatus according to claim 26, wherein the first power control command includes one or more control bits indicating the communications link is out-of-sync.

28. The transmitter apparatus according to claim 26, wherein the first power increase rate is a moderate increase rate and the second power increase rate is a regular rate normally used to increase the transmitter's power level for transmitting over the first communications link.

29. The transmitter apparatus according to claim 26, wherein the transmitter is associated with a user equipment or a mobile station.

30. The transmitter apparatus according to claim 26, wherein the receiver is associated with a radio base station.

* * * * *